United States Patent
Tan

(10) Patent No.: US 7,894,420 B2
(45) Date of Patent: Feb. 22, 2011

(54) FAST PATH PACKET DESTINATION MECHANISM FOR NETWORK MOBILITY VIA SECURE PKI CHANNEL

(75) Inventor: Tat Kin Tan, Penang (MY)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 11/776,926

(22) Filed: Jul. 12, 2007

(65) Prior Publication Data

US 2009/0016362 A1    Jan. 15, 2009

(51) Int. Cl.
 H04L 12/28    (2006.01)
(52) U.S. Cl. .................................... 370/351; 455/432.1
(58) Field of Classification Search ........................ None
 See application file for complete search history.

(56) References Cited

U.S. PATENT DOCUMENTS

| | | | |
|---|---|---|---|
| 6,836,765 B1 | 12/2004 | Sussman | |
| 6,954,790 B2 * | 10/2005 | Forslow | 709/227 |
| 7,031,328 B2 * | 4/2006 | Thubert et al. | 370/401 |
| 7,039,035 B2 * | 5/2006 | Droms et al. | 370/338 |
| 7,046,647 B2 * | 5/2006 | Oba et al. | 370/331 |
| 7,143,282 B2 * | 11/2006 | Takagi et al. | 713/153 |
| 7,174,018 B1 | 2/2007 | Patil et al. | |
| 7,313,631 B1 * | 12/2007 | Sesmun et al. | 709/245 |
| 7,333,461 B2 * | 2/2008 | Thubert et al. | 370/338 |
| 7,701,937 B2 * | 4/2010 | Narayanan et al. | 370/390 |
| 2001/0047407 A1 | 11/2001 | Moore et al. | |
| 2003/0093691 A1 * | 5/2003 | Simon et al. | 713/201 |
| 2003/0196084 A1 | 10/2003 | Okereke et al. | |
| 2004/0117653 A1 | 6/2004 | Shapira et al. | |
| 2004/0223491 A1 * | 11/2004 | Levy-Abegnoli et al. | 370/389 |
| 2004/0228343 A1 * | 11/2004 | Molteni et al. | 370/392 |
| 2005/0055576 A1 | 3/2005 | Mononen et al. | |
| 2005/0144439 A1 | 6/2005 | Park et al. | |
| 2007/0006296 A1 | 1/2007 | Nakhjiri et al. | |
| 2007/0081512 A1 * | 4/2007 | Takeda et al. | 370/349 |
| 2008/0176560 A1 * | 7/2008 | Dutta et al. | 455/433 |
| 2008/0310323 A1 * | 12/2008 | Shirota et al. | 370/254 |
| 2009/0016253 A1 * | 1/2009 | Lewis et al. | 370/312 |

OTHER PUBLICATIONS

Non Final Office Action mailed Apr. 21, 2010 for U.S. Appl. No. 11/371,594; 20 pages.
Notice of Allowance mailed Sep. 21, 2010 for U.S. Appl. No. 11/371,594; 11 pages.
Final Office Action mailed Dec. 2, 2009 for U.S. Appl. No. 11/371,594; 19 pages.
Non Final Office Action mailed May 15, 2009 for U.S. Appl. No. 11/371,594; 19 pages.

* cited by examiner

*Primary Examiner*—Phirin Sam
(74) *Attorney, Agent, or Firm*—Grossman, Tucker, Perreault & Pfleger, PLLC

(57) ABSTRACT

Disclosed is a method for reducing routing overheads during data transmission to a destination mobile router of a plurality of mobile routers roaming in a network. The method comprises registering by top level mobile routers with a central authority server, sending data packets by a corresponding node of the network to the destination mobile router operationally attached to a corresponding top level mobile router, locating a position of the destination mobile router by identifying attachment of the destination mobile router to the corresponding top level mobile router from the information registered by the plurality of mobile routers with the central authority server, routing the data packet directly to the corresponding top level mobile router to which the destination mobile router is operationally attached and receiving the data packet by the destination mobile router from the corresponding top level mobile router, thereby reducing routing overheads in the network.

20 Claims, 4 Drawing Sheets

FAST PATH PACKET DESTINATION MECHANISM FOR NETWORK MOBILITY VIA SECURE PKI CHANNEL

FIELD

The present disclosure relates to routing systems in wireless networks, and, more particularly, to a fast packet destination mechanism for network mobility via a secure PKI channel.

BACKGROUND

In networking environments that include devices or nodes on a network coupled to the Internet, the nodes may move and/or become mobile (e.g., mobile network nodes "MNNs"). In this environment, maintaining a continuous network connection with these MNNs due to that movement is difficult. For example, an MNN utilizes Mobile Internet Protocol Version 6 (MIPv6) to communicate with another node on a network that couples to the Internet. In this example, the MNN moves such that its point of attachment to the Internet has changed and is different than its previous point of attachment. A point of attachment, for example, may be a link to an access point (wired or wireless) for a network that couples to the Internet. The network that couples to the Internet may include, but is not limited to, wired or wireless local area networks (LAN/WLAN), wide area networks (WAN/WWAN), metropolitan area networks (MAN), personal area networks (PAN) and cellular or wireless broadband telephony networks.

Typically, a network address (e.g., IPv4 or IPv6 address) is associated with the MNN's point of attachment to the Internet. When the MNN's point of attachment changes, another network address is associated with the MNN's new point of attachment to the Internet. This may result in a corresponding change in the MNN's network address. Simply changing the MNN's network address based on a change in the point of attachment may allow the MNN to communicate with another node uninterrupted, for example, at the Open Systems Interconnection (OSI) data link layer. However, the MNN may be a mobile handheld or notebook personal computer that has established higher layer connections (e.g., transport and higher levels) with another node. These higher layer connections (e.g., a virtual private network (VPN) connection) may be based on the MNN maintaining a specific network address. Due to authentication requirements, these higher layer connections between the MNN and the node likely cannot be maintained by just changing the network address.

Industry initiatives have tried to address a possible interruption in communications via higher level connections. These initiatives allow an MNN to move from one point of attachment to another without changing the address to which other nodes may forward data to the MNN. Thus, the MNN's network address from the perspective of other nodes has not changed. One such initiative is the Internet Engineering Task Force, Network Working Group, Request for Comments: 3775, Mobility Support in IPv6, published June 2004 ("RFC 3775"). RFC 3775 describes a MIPv6-based communication protocol that allows an MNN to move from one point of attachment to another without changing the network address some or most other nodes may use to communicate with that MNN. This is accomplished by giving the MNN a home address that is associated with its original or initial point of attachment to the Internet. This original or initial point of attachment is typically referred to as the home link. Other nodes will forward communications to a node (e.g., a router) on the home link using that home address associated with the home link. Communications are then forwarded to the MNN by the node on the home link. Thus, as the MNN moves to different points of attachment, that movement is transparent to higher layer connections with other nodes.

Another industry initiative addresses instances where an MNN is part of a network that also moves and/or becomes mobile ("mobile network"). One such initiative is the Internet Engineering Task Force, Network Working Group, Request for Comments: 3963, Network Mobility (NEMO) Basic Support Protocol, published January 2005 ("RFC 3963"). RFC 3963 describes a protocol that allows every node coupled to a mobile network to maintain communications with other nodes in or outside of the mobile network while the mobile network moves around and changes its point of attachment to the Internet. The mobile network may couple to the Internet through a node that is also mobile or becomes mobile and has routing capabilities, e.g., a mobile router. In that sense, the mobile network is commonly called a nested network when coupled to another router that is part of another network.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items.

Figure 1:
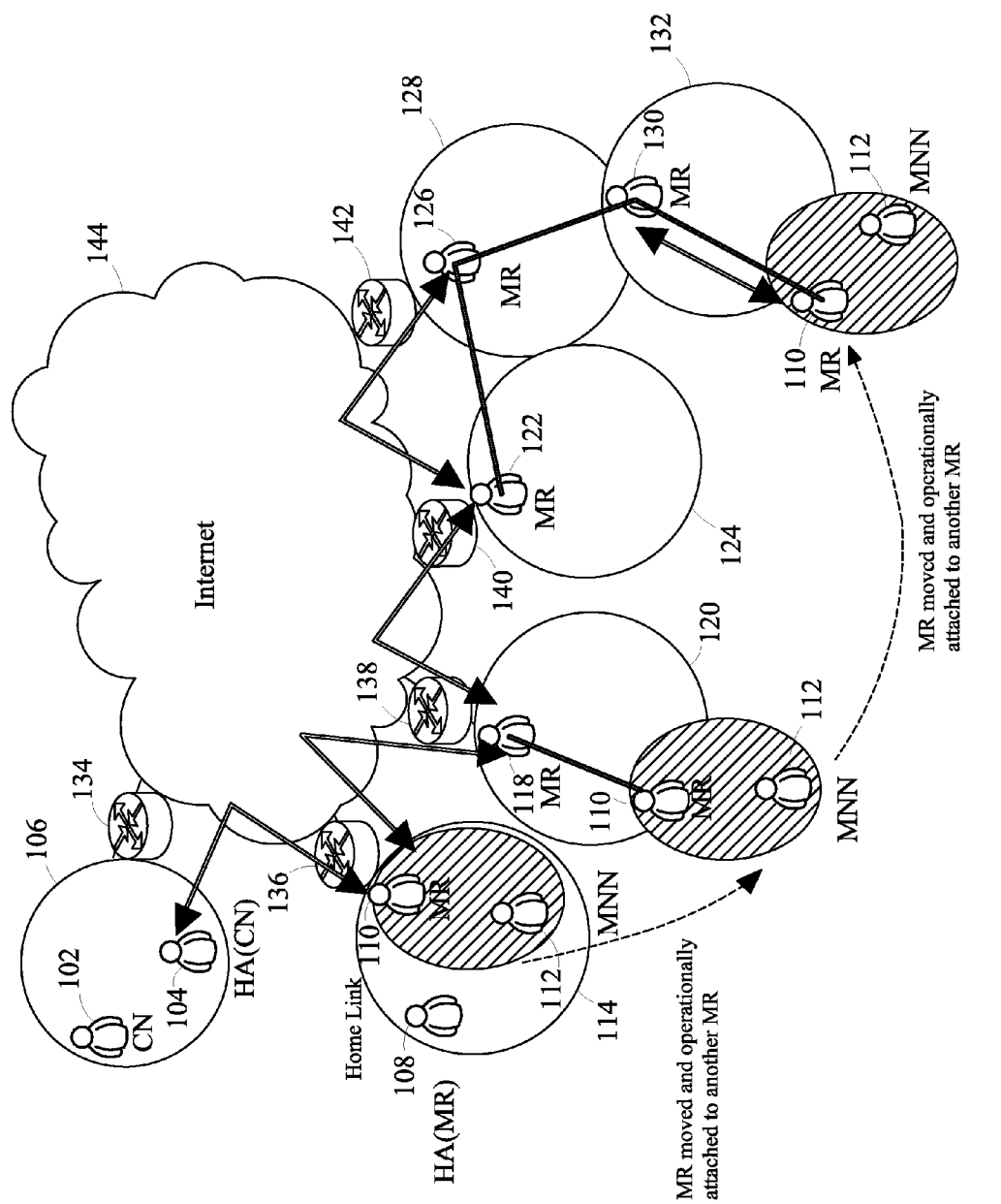
FIG. 1 is a schematic diagram of a traditional system illustrating a plurality of Mobile Routers (MRs) communicating amongst each other using a NEtwork MObility (NEMO) protocol in a network.

FIG. 1 is a schematic diagram of a traditional system illustrating a plurality of Mobile Router (MR)s 110, 118, 122, 126 and 130 communicating among each other using a NEtwork MObility (NEMO) protocol in a network 144, for example Internet. The network 144 may be a wireless network, for example, a Global System (GSM) network, a Code Division Multiple Access (CDMA) network, and a Wireless Fidelity (WiFi) network. The NEMO protocol defines support for mobility of devices, for example, the plurality of MRs 110, 118, 122, 126 and 130 in the network 144. The ultimate goal of NEMO protocol is to ensure session continuity for all MRs within the network 144. Further, the NEMO protocol ensures uninterrupted communication between the MRs, when a MR, for example, MR 110 changes position and attaches with a set of plurality of MRs. The MR 110 changes the position and attaches to the set of MRs 118, 122 and 126, before finally attaching to the MR 130. Furthermore, the NEMO protocol provides connectivity and reachability to a Mobile Network Node (MNN), for example, 112 attached to the MR 110 in the network 144.

The NEMO protocol uses an Internet Protocol Security (IPSec) Encapsulating Security Payload (ESP) protected bi-directional tunneling between MRs and Home Agents (HA) operationally attached to the MRs, for example HA 108 of the MR 110. Further, in the NEMO protocol as part of protocol extension to an existing Mobile Internet Protocol Version 6 (MIPv6), the HA 108 maintains a cache that stores the current location of the MR or MNN, for example, the HA 108 maintains a cache for storing the current location of the MR 110.

The traditional system further includes a plurality of Access Routers (ARs) 134, 136, 138, 140 and 142, a Corresponding Node (CN) 102 and a HA 104 of the CN 102. The plurality of ARs 134, 136, 138, 140 and 142 are connected to the network 144 and provide a communication path for the CN 102 and plurality of MRs 110, 118, 122, 126 and 130. The CN 102 is capable of sending data packets to the plurality of MRs 110, 118, 122, 126 and 130. Further, each of the plurality of MRs 110, 118, 122, 126 and 130 and the CN 102 may include a Local Area Network (LAN) 114, 120, 124, 128, 132 and 106 in which the plurality of MRs 110, 118, 122, 126 and 130 and the CN 102 may transfer the data packets to other mobile devices and fixed devices. In alternative embodiments, wireless LANs (WLAN) and/or PANs and/or other network topologies may be used in addition to, or in replacement of, the aforementioned LANs. For example, the MR 110 may transfer the data packets received from the plurality of MRs 118, 122, 126, and 130 and the CN 102 to other mobile devices and fixed devices within the LAN 114. Also, the other mobile devices and the fixed devices within the LAN 114 may transfer the data packets to the plurality of MRs 118, 122, 126 and 130 and the CN 102 through the MR 110.

In the traditional system, if the MR 110 is at its home link, that is, MR 110 is connected directly to the AR 136, then MR 110 relies on the IPSec ESP protected bi-directional tunnel to provide communications between the MNN 112 and CN 102. The MNN is given a Home of Address (HoA) upon first boot up at the home link by the MR 110. The MR 110 has a subnet address and assigns network address to the MNN 112 attached to an ingress interface of the MR 110 through DHCPv6 (Dynamic Host Configuration Protocol for IPv6) mechanism. In addition, the MR 110 may be configured for other communications, for example, router advertisement and router solicitation, each of which may enable MR to discover at least one other MR and to communicate with same.

In case the MR 110 roams to another subnet (for example, MR 110 attaches to the MR 118, thereafter the MR 110 attaches to the MR 130), then MR 110 sends information to the HA 108 to inform HA 104 that MR 110 is attached to the MR 118 and may be reached via a CoA (Care of Address), in compliance with the MIPv6 protocol. The CoA is a temporary IP address for the MR 110 which enables the MR 110 to receive data packets from the plurality of MRs 118, 122, 126 and 130, when the MR 110 roams to another subnet. The CoA is then registered in the HA 104 and the CoA is contained within a Binding Update (BU). Thereafter, an end-to-end IPSec ESP protected bi-directional tunnel is setup between the HA 104 and the MR 118.

Figure 2:
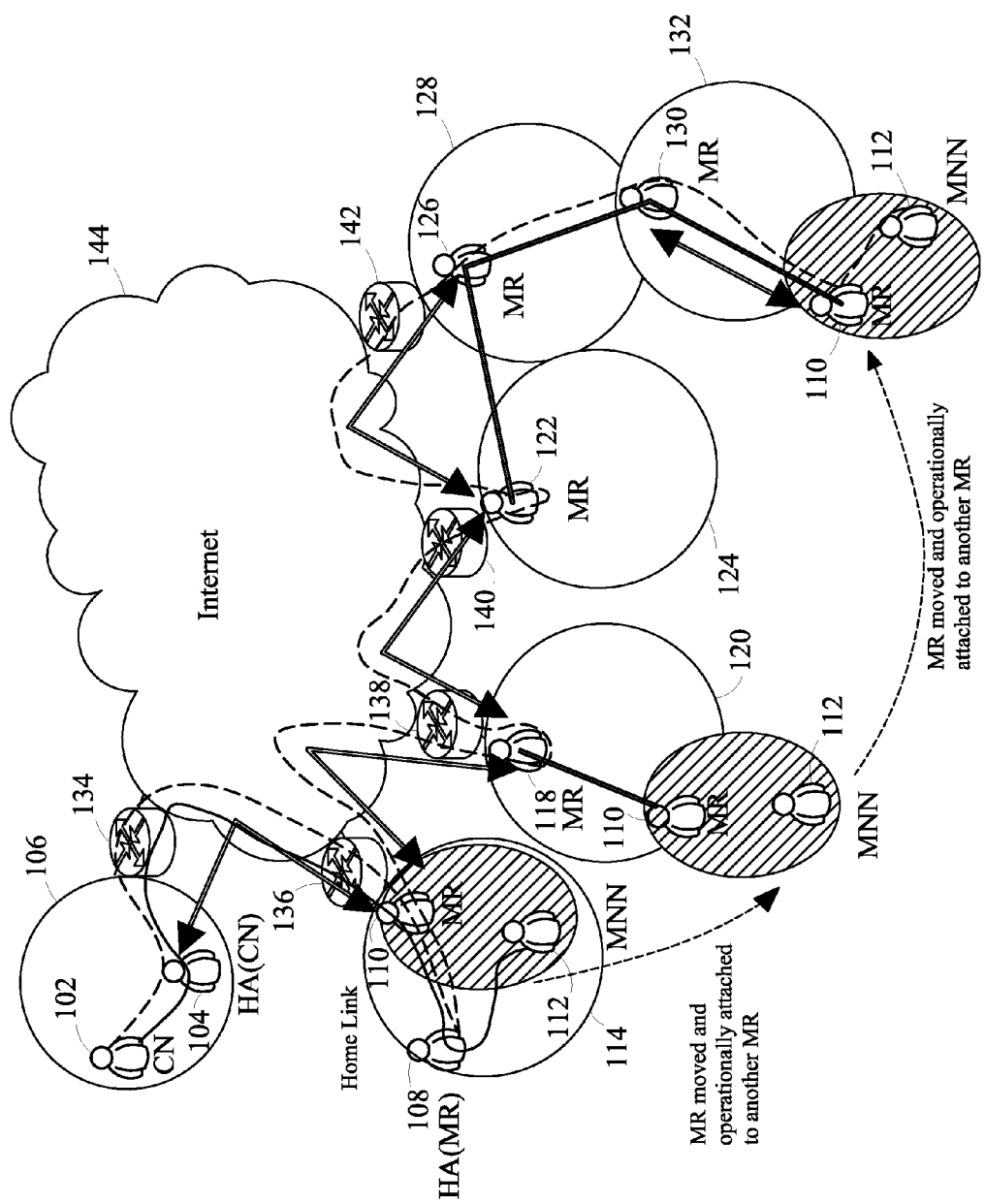
FIG. 2 is a schematic diagram of the traditional system illustrating a flow of a data through the plurality of MRs in a NEMO protocol network.

FIG. 2 is a diagram of the traditional system illustrating a flow of a data through the plurality of MRs 110, 118, 122, 126 and 130, when the MR 110 roams to another subnet, for example, MR 110 attaches to the MR 118, thereafter the MR 110 attaches to the MR 130.

The flow of data is initiated when the data packet is send by the CN 102, the data packet being sent to the MR 110. The data packet will first arrive to MR 110 home link and being intercepted by the HA 108. If the MR 110 is at the home link, which is connected to the AR 136, then the HA 108 will just route the data packet directly to MR 110 (using standard MIPv6 protocol, and/or other routing mechanism). However, the CN 102 does not know the position of MR 110 and does not know that the MR 110 has roamed away and attached to the MR 118 and is reachable at a newly assigned CoA on a different subnet. Since MR 110 has informed HA 104 regarding MR 110's new position via the BU, the HA 104 will map to the newly assigned CoA of the MR 110 to the HoA.

In order for the data packet to flow through the IPSec ESP protected bi-directional tunnel, the HA 104 will construct an outer layer of IP header with a source and a destination of the outer layer of IP header as the entrance and exit point of the IPSec ESP protected bi-directional tunnel. The HA 104 will then forward the data packet to the MR 118 via the IPSec ESP protected bi-directional tunnel. Once MR 118 receives the data packet, the MR 118 will strip off the outer layer of the IP header and retrieve an inner IP header for inspection. Due to the security design of MIPv6 and NEMO on the recommendation of using IPSec ESP, the process of encryption and decryption will take place when the data packet enters and exits the IPSec ESP protected bi-directional tunnel.

The MR 118 after checking the outer layer of the IP header realizes that the data packet is destined for MR 110 and realizes that the MR 110 is attached to one of MR 118 ingress interfaces. MR 118 will then route the data packet over to the MR 110 for further processing.

Further, when MR 110 roams and attaches to the MR 130, then the data packet from the CN 102 will have to travel to many routing paths and many bi-directional tunnels. The path followed by the data packet will be CN 102 to HA 104, HA 104 to MR 118, MR 118 to MR 122, MR 122 to MR 126, and MR 126 to MR 130. The routing paths may be visualized as a network tree structure with HA 104 being overloaded as the MR 110 dived deep and have n-depth of branches of routes. The MRs 118, 122, 126 and 130 that are attached to the plurality of ARs 136, 138, 140 and 142 may be visualized as the top level tree node. The routing path to reach MR 110 will go to $n^{th}$ deeper when MR 110 roamed $n^{th}$ times.

The processing cost for transferring the data packet is high due to $n^{th}$ depths in terms of cryptography used in the NEMO protocol. The network tree will be stressed to grow to $n^{th}$ path deep and the routing cost will be extremely high and intangible. Because of processing due to cryptography, the situation become worsened due to the fact of loading on IPSec ESP protected bi-directional tunneling, as there exists a need of involvement of multiple levels and repetition of encryption-decryption processes.

The overheads of NEMO protocol, i.e. the security features such as cryptography, will become a burden to the mobility and reliability of the network and will jeopardize the communications among the plurality of MRs 108, 118, 122, 126 and 130.

Figure 3:
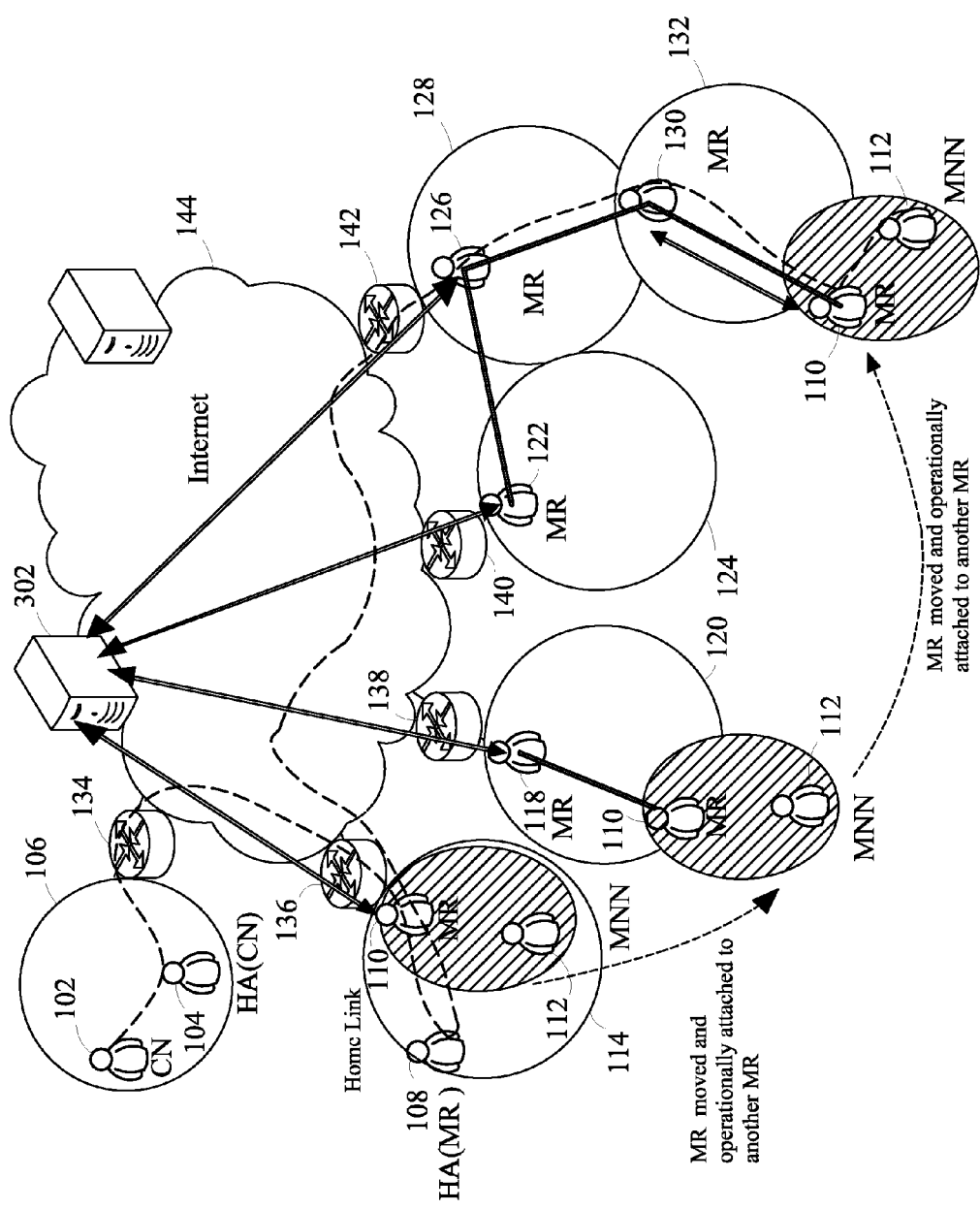
FIG. 3 is a schematic diagram of a routing system for reducing routing overheads in a network, according to an exemplary embodiment of the present disclosure in the network.

FIG. 3 is a schematic diagram of a routing system for reducing overheads in a network 144. The routing system includes all the components as described in the FIG. 1 and FIG. 2. The routing system further includes a Central Authority (CA) server 302. In one embodiment, the CA server 302 is an Internet Service Provider (ISP). The plurality of MRs 110, 118, 122, 126 and 130 are capable of roaming within the network 144. The MRs 110, 118, 122 and 126 act as top level MRs. The top level MRs 110, 118, 122 and 126 are directly connected to the network 144 through the plurality of ARs 136, 138, 140 and 142. Each of the plurality of MRs is capable of operationally attaching to the top level MRs 110, 118, 122 and 126, for example, the MR 110 is attached to the top level MR 118.

The CA server 302 may be used as a trusted Central Certificate Authority, which may be used in public and private key infrastructures. In addition, consistent with this disclosure, the CA server 302 may used to manage the routings and channeling whenever a MR of the plurality of MRs 110, 118, 122, 126 and 130 roams and attaches to other MRs. Thus, the CA server may be used for managing routing and channeling information as "piggy back" services to the more conventional services offered by the CA server. For example, the MR 110 attaches to the MR 118. The CA server 302 is capable of storing information about the top level MRs and the MRs attached to the top level MRS. Each of the top level MRs will be required to register their routing table to the CA server 302 through MR route registration channeling. The MR route registration channeling is done periodically and contains information of the number of subnets each top level MR supports. The CA servers 302 consolidates the information and channels the routing paths of the MRs to the top level MRs 110, 118, 122 and 126 using route registration channeling and route advertisement mechanism.

The CN 102 is capable of sending the data packets to a destination MR, for example, the MR 110 and the destination MR is attached to the top level MR 130. The data packets are send to the home link of the MR 110 attached to the network 144 through the AR 136. Since the routing paths of the MRs attached to the top level MRs 110, 118, 122 and 126 is send by the CA server 302 to all the top level MRs 110, 118, 122 and 126, accordingly, once the data packets reach the HA 108 of MR 110, the HA 108 sends the data packet directly to the MR 126 using the information stored in the CA 302. The MR 126 upon receiving the data packets will send the data packets to the destination MR 110.

The routing system of the present disclosure provides significant improvement for reducing overheads and uses a faster routing path. For example, as mentioned above, the routing path of the data packets by-passes the MR 118 and the MR 122 as compared to the traditional system described in conjunction with FIG. 1 and FIG. 2.

Figure 4:
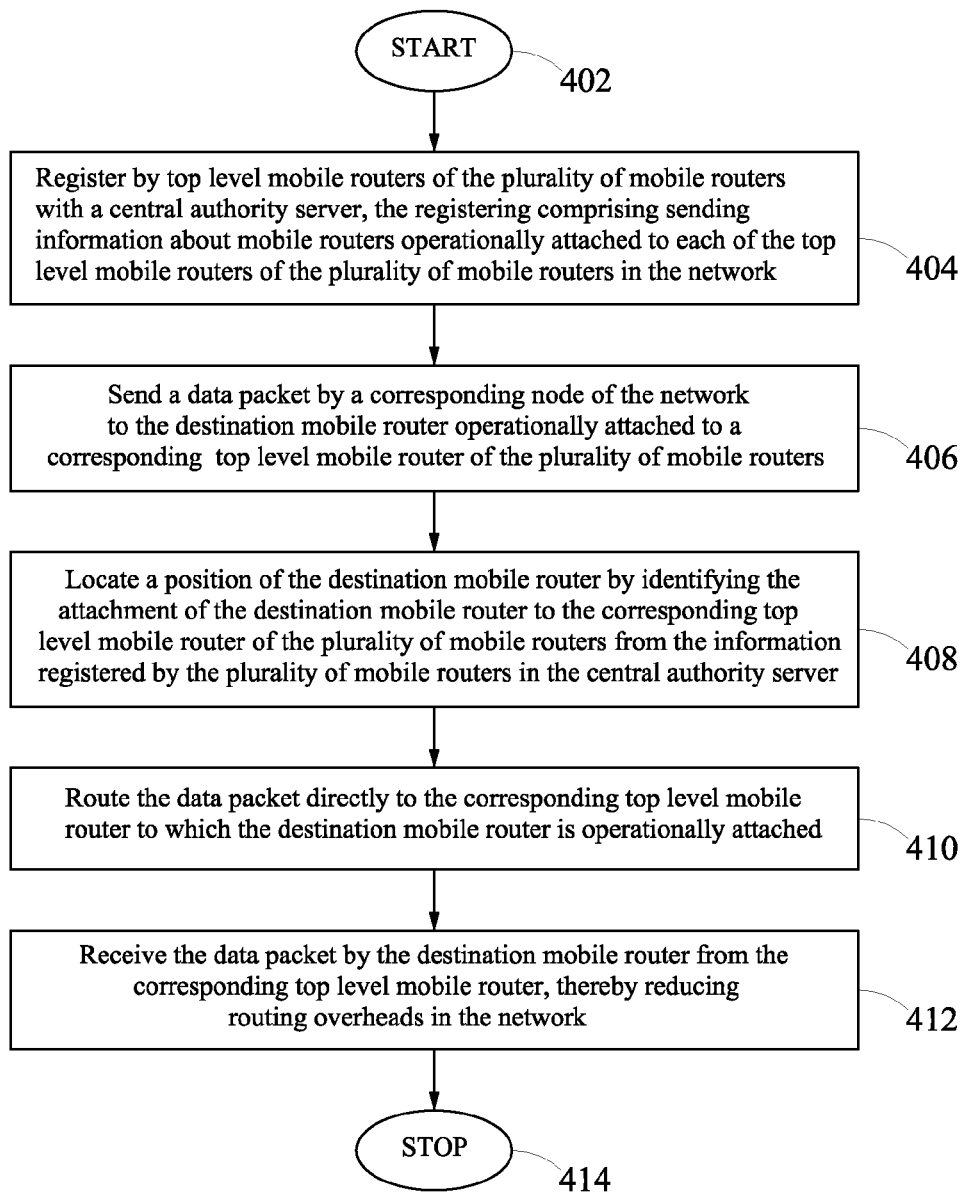
FIG. 4 is a flow diagram of a method for reducing overheads in the network.

FIG. 4 is a flow diagram of a method for reducing overheads during data transmissions to the destination MR from the plurality of MRs 110, 118, 122, 126 and 132 roaming in the network 144. The method initiates at 402. At 404, each of the top level MRs, for example, the MRs 110, 118, 122 and 126, register with the CA server 302, the registration comprises sending information about MRs attached to each of the top level MRs 110, 118, 122 and 126 to the CA server 302. At 406, the CN 102 sends the data packets to the destination MR, for example, the MR 110. The destination MR 110 is operationally attached to the top level MR 130. At 408, the position of the MR 110 is located by the HA 108 of the MR 110, because the data packets destined for the destination MR 110 reaches the HA 108 of MR 110. At 410, the data packets are routed to the top level MR 126 of the destination MR 110 using the information stored in the CA server 302. At 412, the destination MR 110 receives the data packets from the top level MR 126. The method terminates at 414.

As described above, the embodiments of the disclosure may be in the form of computer-implemented processes and apparatuses for practicing those processes. Embodiments of the disclosure may also be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. The present disclosure may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omission and substitutions of equivalents are contemplated as circumstance may suggest or render expedient, but such modifications are intended to cover the application or implementation without departing from the spirit or scope of the claims of the present disclosure.

What is claimed is:

1. A routing system using a NEtwork MObility (NEMO) protocol for reducing overheads in a network, the routing system comprising:

a plurality of mobile routers roaming in the network, some of the plurality of mobile routers capable of acting as top level mobile routers and a remaining of the plurality of mobile routers capable of operationally attaching to the top level mobile routers;

a central authority server capable of storing information about the top level mobile routers and the mobile routers operationally attached to each of the top level mobile routers; and a corresponding node capable of sending data packets to a destination mobile router of the plurality of mobile routers operationally attached to the top level mobile routers;

wherein each of the top level mobile routers is capable of registering with the central authority server, the registering comprising sending information about mobile routers operationally attached to each of the top level mobile routers; and wherein the corresponding node is capable of locating a position of the destination mobile router operationally attached to a corresponding top level mobile router from the information stored with the central authority server; and wherein the corresponding node is capable of routing the data packets directly to the destination mobile router through the corresponding top level mobile router by using the information about the mobile routers operationally attached to the top level mobile routers stored with the central authority server; and wherein the corresponding top level mobile router sending the data packets to the destination mobile router, thereby reducing routing overheads in the network.

2. The routing system of claim 1, wherein each of the plurality of mobile routers uses Internet Protocol Security (IPSec) Encapsulating Security Payload (ESP) protected bi-directional tunnel for transferring data packets.

3. The routing system of claim 1, wherein storing information about the top level mobile routers and the mobile routers operationally attached to each of the top level mobile routers is done periodically by each of the plurality of top level mobile routers.

4. The routing system of claim 1, wherein the central authority server is an Internet Service Provider (ISP).

5. A method for reducing routing overheads during data transmission to a destination mobile router of a plurality of mobile routers roaming in a network, the method comprising:

registering by top level mobile routers of the plurality of mobile routers with a central authority server, the registering comprising sending information about mobile routers operationally attached to each of the top level mobile routers of the plurality of mobile routers in the network;

sending data packets by a corresponding node of the network to the destination mobile router operationally attached to a corresponding top level mobile router of the plurality of mobile routers;

locating a position of the destination mobile router by identifying attachment of the destination mobile router to the corresponding top level mobile router of the plurality of mobile routers from the information registered by the plurality of mobile routers with the central authority server;

routing the data packets directly to the corresponding top level mobile router to which the destination mobile router is operationally attached; and receiving the data packets by the destination mobile router from the corresponding top level mobile router, thereby reducing routing overheads in the network.

6. The method of claim 5, wherein the network is compatible with a NEtwork MObility (NEMO) protocol.

7. The method of claim 5, wherein each of the plurality of mobile routers use Internet Protocol Security (IPSec) Encapsulating Security Payload (ESP) protected bi-directional tunnel for transferring data packets.

8. The method of claim 7, wherein the Internet Protocol Security Encapsulating Security Payload is capable of using cryptography when the plurality of data packets are send and received by each of the plurality of mobile routers.

9. The method of claim 5, wherein registering by the top level mobile routers of the plurality of mobile routers with the central authority server is done periodically by each of the top level mobile routers.

10. The method of claim 5, wherein the central authority server is an Internet Service Provider (ISP).

11. The method of claim 5, wherein the network is a wireless network.

12. The method of claim 11, wherein the wireless network is one of a Global System (GSM) network, a Code Division Multiple Access (CDMA) network, and a Wireless Fidelity (WiFi) network.

13. A computer program product embodied on a tangible computer readable medium for reducing routing overheads during data transmission to a destination mobile router of a plurality of mobile routers roaming in a network, which when executed by a processor, cause the processor to perform operations, the computer program product comprising a program module having instructions for:

registering by top level mobile routers of the plurality of mobile routers with a central authority server, the registering comprising sending information about mobile routers operationally attached to each of the top level mobile routers of the plurality of mobile routers in the network;

sending data packets by a corresponding node of the network to the destination mobile router operationally attached to a corresponding top level mobile router of the plurality of mobile routers;

locating a position of the destination mobile router by identifying attachment of the destination mobile router to the corresponding top level mobile router of the plurality of mobile routers from the information registered by the plurality of mobile routers with the central authority server;

routing the data packets directly to the corresponding top level mobile router to which the destination mobile router is operationally attached; and receiving the data packets by the destination mobile router from the corresponding top level mobile router, thereby reducing routing overheads in the network.

14. The computer program product of claim 13, wherein the network is compatible with a NEtwork MObility (NEMO) protocol.

15. The computer program product of claim 13, wherein each of the plurality of mobile routers use Internet Protocol Security (IPSec) Encapsulating Security Payload (ESP) protected bi-directional tunnel for transferring data packets.

16. The computer program product of claim 15, wherein the Internet Protocol Security Encapsulating Security Payload is capable of using cryptography when the plurality of data packets are send and received by each of the plurality of mobile routers.

17. The computer program product of claim 13, wherein registering by the top level mobile routers of the plurality of mobile routers with the central authority server is done periodically by each of the top level mobile routers.

18. The computer program product of claim 13, wherein the central authority server is an Internet Service Provider (ISP).

19. The computer program product of claim 13, wherein the network is a wireless network.

20. The computer program product of claim 19, wherein the wireless network is one of a Global System (GSM) network, a Code Division Multiple Access (CDMA) network, and a Wireless Fidelity (WiFi) network.

* * * * *

UNITED STATES PATENT AND TRADEMARK OFFICE
CERTIFICATE OF CORRECTION

PATENT NO. : 7,894,420 B2
APPLICATION NO. : 11/776926
DATED : February 22, 2011
INVENTOR(S) : Tat Kin Tan Page 1 of 1

It is certified that error appears in the above-identified patent and that said Letters Patent is hereby corrected as shown below:

In the Claims:

In column 7, line 33, claim 5, after "a" insert -- single -- central

In column 8, line 17, claim 13, after "a" insert -- single -- central

Signed and Sealed this
Fourteenth Day of May, 2013

Teresa Stanek Rea
*Acting Director of the United States Patent and Trademark Office*